United States Patent [19]

Seuring et al.

[11] Patent Number: 4,743,731
[45] Date of Patent: May 10, 1988

[54] DISINTEGRATING ELECTRODES

[76] Inventors: Gene E. Seuring, 5697 Hadden Pl., Rockford, Ill. 61111; Richard C. Lindsay, Rte. 3, Oregon, Ill. 61061

[21] Appl. No.: 79,696

[22] Filed: Jul. 30, 1987

[51] Int. Cl.⁴ .............................. B23K 9/24; B23H 1/04
[52] U.S. Cl. .................................... 219/69 R; 204/280; 219/69 E
[58] Field of Search ............... 219/69 R, 69 D, 69 E, 219/69 V, 70, 68; 204/280

[56] References Cited

U.S. PATENT DOCUMENTS

| | | | |
|---|---|---|---|
| 2,385,665 | 9/1945 | Warwick | 219/69 V |
| 3,058,895 | 10/1962 | Williams | 219/69 E |
| 4,182,947 | 1/1980 | Brower | 219/70 |
| 4,441,004 | 4/1984 | Inoue | 219/69 E |
| 4,470,896 | 9/1984 | Petitimbert | 219/69 E |
| 4,541,616 | 9/1985 | Dean | 219/70 |
| 4,596,916 | 6/1986 | Inoue | 219/69 D |
| 4,660,807 | 4/1987 | Campana | 219/69 E |

FOREIGN PATENT DOCUMENTS 263624 12/1985 Japan .................. 219/69 D

*Primary Examiner*—A. D. Pellinen
*Assistant Examiner*—Geoffrey S. Evans
*Attorney, Agent, or Firm*—Leydig, Voit & Mayer

[57] ABSTRACT

A metal disintegrating electrode for forming a hole in a metal workpiece such as a pipe by a thermo-fracture process without creating large chips or particles that otherwise would contaminate the inside of the pipe. The electrode comprises an elongated tubular sheath filled with a cluster of tubes or a cluster of tubes and rods which cause the metal of the pipe to disintegrate into small particles. The tubes also conduct a flow of coolant against the pipe and along the outside of the tubular sheath in order to promote the thermo-fracture process and to keep the electrode from sticking to the pipe.

14 Claims, 2 Drawing Sheets

DISINTEGRATING ELECTRODES

BACKGROUND OF THE INVENTION

This invention relates generally to the formation of holes in metal workpieces by means of a metal disintegrator which operates on a thermo-fracture principle.

Metal disintegrators for forming holes in workpieces are sold by Electro Arc Manufacturing Company of Ann Arbor, Mich. The model 2-S disintegrator sold by that company includes an elongated hollow electrode (called a disintrode) adapted to be vibrated and adapted to be connected to one terminal of a voltage source. The workpiece is connected to the other terminal of the voltage source and, when the vibrating electrode approaches the workpiece, an electrical arc jumps across the gap between the electrode and the workpiece and heats the workpiece. At the same time, liquid coolant is ejected out of the electrode and quenches the workpiece. The combined action of the heating and cooling fractures the material of the workpiece and causes the material to disintegrate so as to form a hole in the workpiece. Some of the material removed from the hole forms a core which moves into the hollow electrode.

In certain instances, it is necessary to be able to form a hole without creating particles or chips of any significant size. One such case involves the formation of holes in pipes for carrying cooling water in a nuclear power generating station. Typical specifications require that the insides of the pipes be free of particles of a size greater than twenty-five microns. There presently is no effective way of forming holes in installed pipes while keeping the insides of the pipes free of large particles as the holes are formed. Accordingly, it has been necessary heretofore to disconnect the pipes, form the holes, clean chips and particles from the insides of the pipes, and then re-connect the pipes. This involves an expensive and time-consuming process.

SUMMARY OF THE INVENTION

The general aim of the present invention is to provide new and improved apparatus for forming holes in metal workpieces without creating particles or chips of any significant size.

A more detailed object of the invention is to achieve the foregoing by providing a unique disintegrating electrode which forms a hole by thermofracturing the workpiece while causing the workpiece to break up into very small particles.

The invention also resides in the provision of a hollow disintegrating electrode containing a cluster of tubes which carry the liquid coolant and which cause the electrode to fracture the metal into very small particles.

These and other objects and advantages of the invention will become more apparent from the following detailed description when taken in conjunction with the accompanying drawings.

DETAILED DESCRIPTION OF THE PREFERRED EMBODIMENTS

Figure 1:
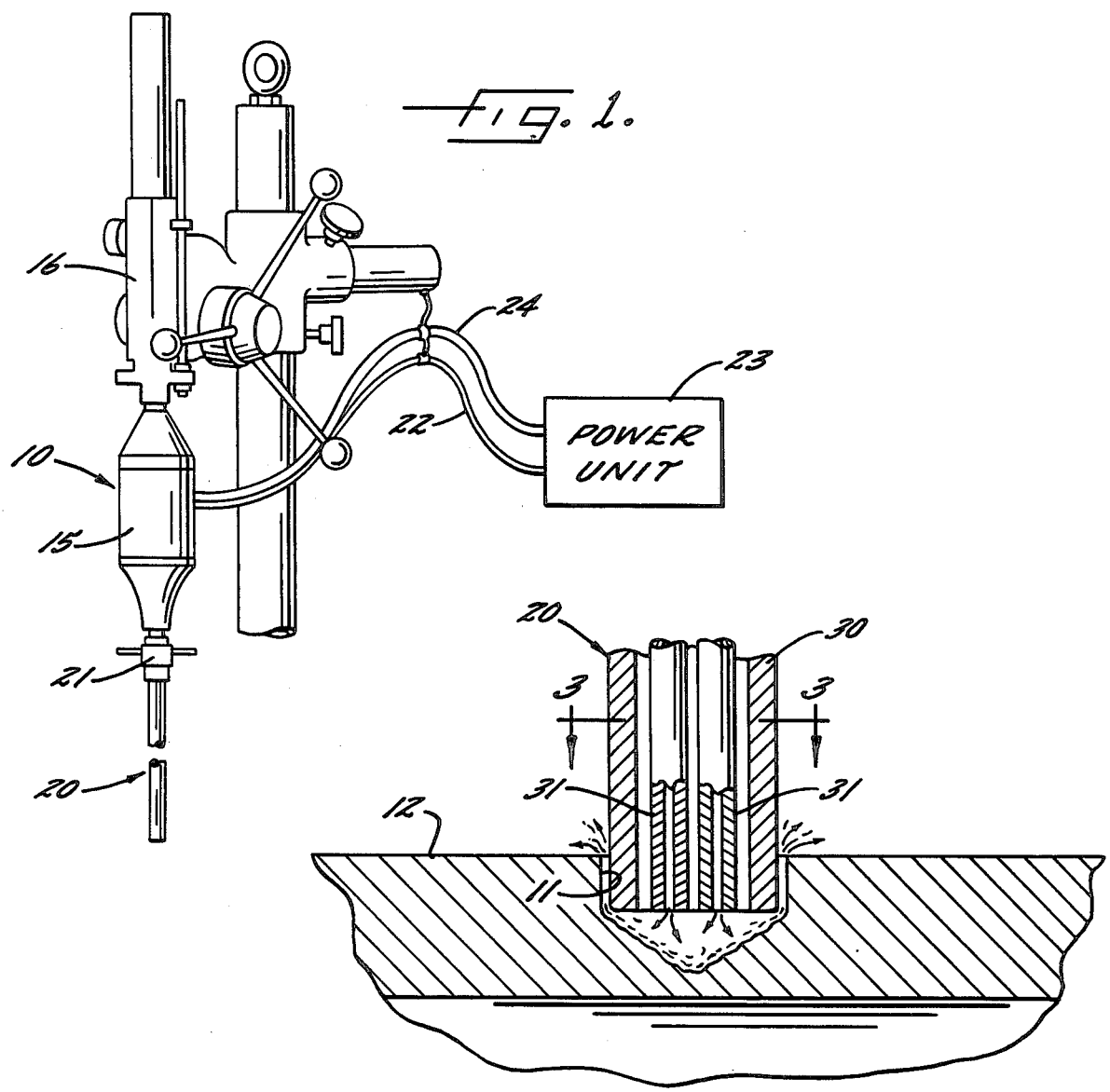
FIG. 1 is a perspective view which shows, in a somewhat schematic manner, a metal disintegrator equipped with one version of a new and improved electrode incorporating the unique features of the present invention.

For purposes of illustration, the invention has been shown in the drawings in conjunction with a metal disintegrator 10 of the type used for forming one or more holes 11 (FIG. 2) in a metal workpiece which herein has been shown as being a pipe 12. The disintegrator per se is conventional and may be of the type sold as a Model 2-A disintegrator by Electro Arc Manufacturing Company of Ann Arbor, Mich.

Briefly, the disintegrator 10 includes a head 15 which is adapted to be chucked in a suitable holding device such as a drill press 16. The latter may be used to advance the head downwardly and also to rotate the head about a vertical axis.

Extending downwardly from the disintegrator head 15 is an electrially conductive electrode 20 which is adapted to be attached releasably to the lower end of the head by a collet 21. A power cable 22 leads from a power unit 23 to the head 15 and energizes a vibrator (not shown) in the head so as to effect vibration of the electrode 20. Another cable 24 in the form of a high pressure polyvinyl hose leads from the power unit to the head and enshrouds a conductor (not shown) which connects the electrode with one terminal of an a.c. voltage source contained within the power unit 23. The cable 24 also serves to deliver liquid coolant from the power unit to the electrode. The coolant may be water or a mixture of water and soluble oil.

An electrical cable (not shown) also is adapted to be connected to the pipe 12 and is connected to the other terminal of the voltage source of the power unit 23. When the electrode 20 approaches the pipe 12, an electric arc jumps the gap between the pipe and the lower end of the electrode and heats the metal of the pipe to a high temperature. At the same time, the liquid flowing through the electrode quenches the metal. This action, together with vibration of the electrode, causes the metal to disintegrate so as to form the hole 11.

The present invention contemplates the provision of a new and improved electrode 20 which is adapted to form the hole 11 in the pipe 12 without creating metal particles or chips of any significant size. As a result, the hole may be formed while keeping the inside of the pipe free of large particles.

Figure 2:
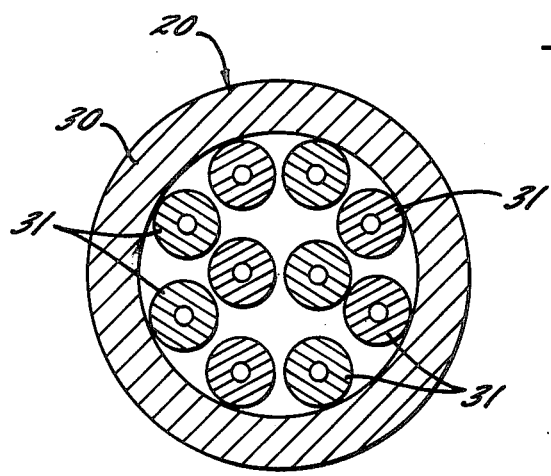
FIG. 2 is a fragmentary cross-sectional view taken axially through the electrode and shows the electrode forming a hole.
Figure 3:
FIG. 3 is an enlarged cross-section taken along the line 3—3 of FIG. 2.

More specifically, the electrode 20 shown in FIGS. 2 and 3 includes an elongated outer tubular sheath 30 made of stainless steel or other electrically conductive metal. In the present instance, the sheath has an outside diameter of about ⅜" and an inside diameter of about 7/16".

In carrying out the inventiion, a cluster of rigid and electrically conductive members in the form of tubes 31 is fixed within the lower or working end portion of the sheath 30 of the electrode 20. In the electrode 20 shown in FIG. 3, eight tubes 31 are arranged in a circle around the inner wall of the sheath 30. Two additional tubes are located adjacent the center portion of the circle and have centers which lie on a common diameter of the sheath. Each tube herein is made of stainless steel and has an outer diameter of about 0.130" and an inner diameter of about 0.040". The tubes are secured rigidly within the sheath by spot brazing the tubes to the inner wall of the sheath and to one another.

With the foregoing arrangement, the tubes 31 divide the large passage normally defined by the inside of the sheath 30 into several discrete smaller passages. Some of the smaller passages are defined by the interiors of the tubes while other ones of the smaller passages are defined by the spaces between adjacent tubes. By virtue of the tubes, the comparatively large-diameter stream of coolant which enters the upper end of the sheath 30 is broken into several discrete streams of substantially smaller diameter. The coolant discharged downwardly through the passages defined within and between the tubes 31 strikes the bottom of the hole 11 and flows upwardly along the outer side of the sheath 30 of the electrode 20 as shown in FIG. 2. The coolant insulates the electrode 20 from the pipe 12 and prevents the electrode from sticking to the pipe.

In addition to dividing the coolant into small streams, the tubes 31 in the sheath 30 prevent the electrode 20 from removing a large core of metal from the pipe 12 during formation of the hole 11. Instead, the multiple tubes in the sheath divide the sheath into multiple cells so as to cause the metal to disintegrate into very small particles of a size not exceeding approximately twenty-five microns.

Figure 4:
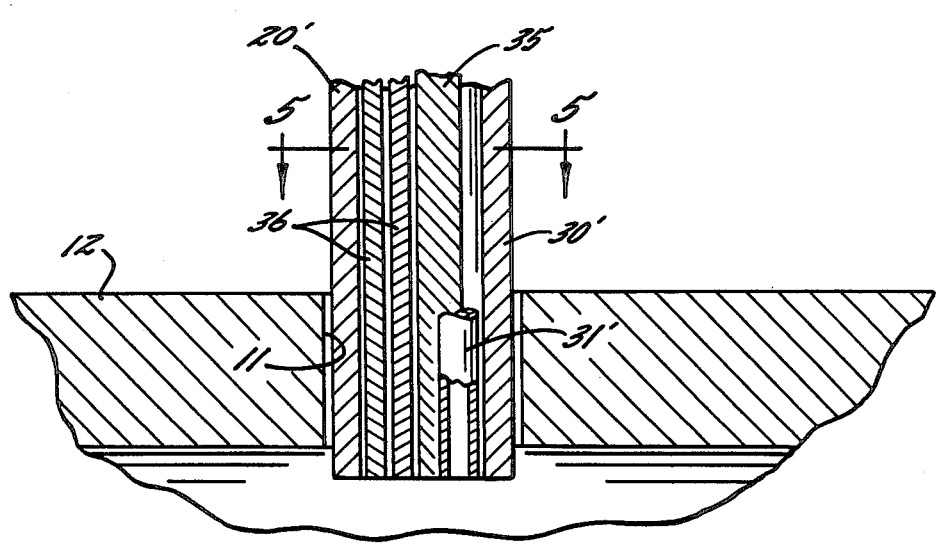
FIG. 4 is a view similar to FIG. 2 but shows another version of the electrode breaking through the hole.
Figure 5:
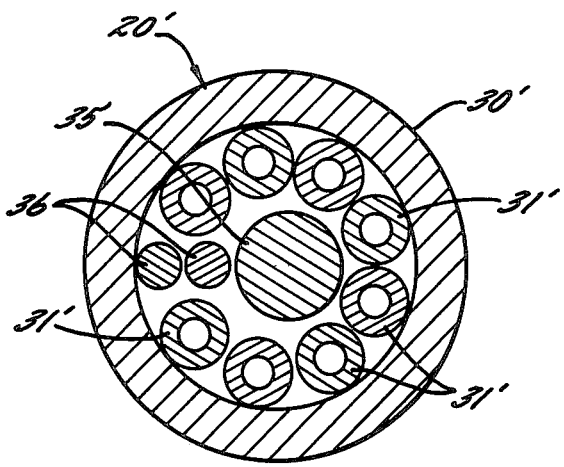
FIG. 5 is an enlarged cross-section taken along the line 5—5 of FIG. 4.

The electrode 20 illustrated in FIGS. 2 and 3 is particularly useful for starting the hole 11 and forming the major depth of the hole. To break through the hole, the electrode 20 preferably is removed from the collet 21 and is replaced with an electrode 20' of the type shown in FIGS. 4 and 5. The electrode 20' differs from the electrode 20 in that the inner diameter of each of the tubes 31' of the electrode 20' is about 0.070". Moreover, a solid stainless steel members or rod 35 having a diameter of about 0.193" is located near the center of the circle defined by the tubes 31'. Finally, two smaller diameter solid stainless steel members or rods 36 each having a diameter of about 0.100" are located between two adjacent tubes 31' and have centers which lie on a common diameter with the center of the rod 35. The above-described arrangement of tubes and rods causes more coolant to be diverted to the outer side of the sheath 30' so as to better insulate the electrode 20' from the pipe 12 as the electrode breaks through the pipe. The tubes 31 of the electrode 20 may be used in place of the tubes 31' of the electrode 20' so as to form yet another type of electrode for effecting final cleaning of the drilled hole and for forming the hole into a cylindrical shape.

From the foregoing, it will be apparent that the present invention brings to the art new and improved electrodes for forming a hole 11 in a metal workpiece 12 while causing the metal of the hole to disintegrate into small particles rather than a large core. The tubes divide the interior of the sheath into small cells to effect particle-like disintegration of the metal and yet still carry sufficient coolant to the outside of the sheath to insulate and prevent sticking of the electrode.

While the electrodes of the invention are useful in many applications, they are particularly advantageous for use in forming holes in the coolant pipes of a nuclear power generating station. Because the electrodes form the holes without creating large particles, there is no need to disconnect the pipes, drill the holes, clean the pipes and then reconnect the pipes. Accordingly, the present electrodes enable a significant saving of labor and a significant reduction in down time.

We claim:

1. An electrode for forming a hole in a metal workpiece, said electrode comprising a rigid and electrically conductive tubular sheath adapted to be connected to a voltage source, said sheath having a working end adapted to be positioned adjacent said workpiece and having an opposite end adapted to communicate with a source of liquid coolant, a cluster of rigid and electrically conductive tubes fixed within the working end portion of said sheath and adapted to communicate with said source of liquid coolant, the coolant being delivered to the working end of said sheath and to said workpiece through said tubes, and flow spaces within said sheath between said tubes for also delivering coolant to the working end of said sheath and to said workpiece.

2. An electrode as defined in claim 1 in which said sheath is of circular cross-section, the tubes of said cluster being arranged in a circle around the inner wall of said sheath.

3. An electrode as defined in claim 2 further including additional rigid tubes fixed within the working end portion of said sheath and disposed adjacent the center portion of said circle.

4. An electrode as defined in claim 3 in which said additional tubes have centers which lie on a common diameter of said sheath.

5. An electrode as defined in claim 2 further including a solid rod fixed within the working end portion of said sheath and disposed adjacent the center portion of said circle.

6. An electrode as defined in claim 5 in which said rod has a circular cross-section of predetermined diameter, and additional solid rods fixed within the working end portion of said sheath, all of said rods having centers which lie on a common diameter of said sheath.

7. An electrode for forming a radially extending hole in a pipe, said electrode comprising a rigid and electrically conductive tubular sheath adapted to be connected to a voltage source, said sheath having inner and outer walls of circular cross-section and having a working end adapted to be positioned adjacent said pipe, the opposite end of said sheath being adapted to communicate with a source of liquid coolant, a cluster of rigid and electrically conductive tubes of circular cross-section fixed within the working end portion of said sheath and adapted to communicate with said source of liquid coolant, said tubes being arranged in a circle around the inner wall of said sheath, the coolant being delivered to the working end of said sheath and to said workpiece through said tubes, and flow spaces within said sheath between said tubes for also delivering coolant to the working end of said sheath and to said workpiece.

8. An electrode as defined in claim 7 further including additional rigid tubes of circular cross-section fixed within the working end portion of said sheath, said additional tubes being disposed adjacent the center portion of said circle and having centers which lie on a common diameter of said circle.

9. An electrode as defined in claim 7 further including a solid rod of circular cross-section fixed within the working end portion of said sheath and disposed adjacent the center portion of said circle.

10. An electrode as defined in claim 9 further including additional solid rods of circular cross-section, fixed within the working end portion of said sheath, all of said rods having centers which lie on a common diameter of said sheath.

11. A disintegrating electrode for forming a hole in a metal workpiece, said electrode comprising a rigid and electrically conductive tubular sheath adapted to be connected to a voltage source and having an electrically uninsulated outer wall, said sheath having a working end adapted to be positioned adjacent said workpiece and having an opposite end adapted to communicate with a source of liquid coolant, a cluster of rigid and electrically conductive members fixed within the working end portion of said sheath, and flow spaces within said sheath between said members for delivering coolant to the working end of said sheath and to said workpiece.

12. A disintegrating electrode as defined in claim 11 in which said members are tubes.

13. A disintegrating electrode as defined in claim 11 in which some of said members are tubes and in which other ones of said members are solid rods.

14. A disintegrating electrode for forming a radially extending hole in a pipe, said electrode comprising a rigid and electrically conductive tubular sheath adapted to be connected to a voltage source, said sheath having inner and outer walls of circular cross-section and having a working end adapted to be positioned adjacent said pipe, the outer wall of said sheath being electrically uninsulated at least adjacent the working end of the sheath, the opposite end of said sheath being adapted to communicate with a source of liquid coolant, a cluster of rigid and electrically conductive tubes of circular cross-section fixed within the working end portion of said sheath and adapted to communicate with said source of liquid coolant, solid rods of electrically conductive material fixed within the working end portion of said sheath, said tubes occupying a greater cross-sectional area of said sheath than is occupied by said rods, coolant being delivered to the working end portion of said sheath and to said workpiece through said tubes, and flow spaces within said sheath between said tubes and said rods for also delivering coolant to the working end of said sheath and to said workpiece.

* * * * *